Oct. 17, 1933.  G. M. NELL  1,931,006
TOOL RETAINER
Filed July 16, 1931
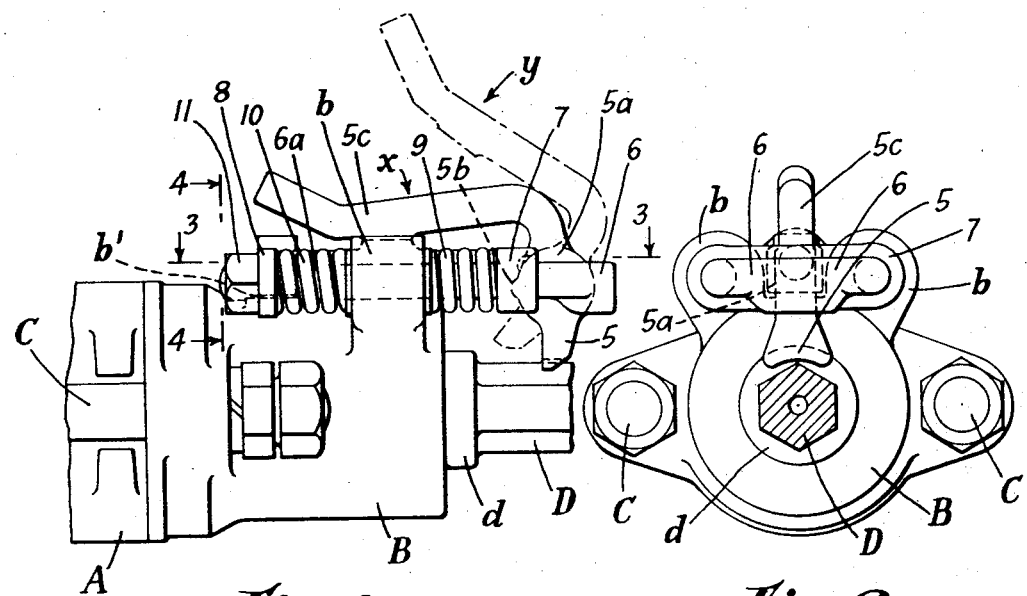
INVENTOR.
Gustave M. Nell
BY
Ira L. Nickerson
ATTORNEY.

Patented Oct. 17, 1933

1,931,006

UNITED STATES PATENT OFFICE 1,931,006

TOOL RETAINER

Gustave M. Nell, Detroit, Mich., assignor to Chicago Pneumatic Tool Company, New York, N. Y., a corporation of New Jersey Application July 16, 1931. Serial No. 551,132

12 Claims. (Cl. 121—32)

This invention relates to apparatus for retaining working tools in operative relation with power machines, such as fluid pressure actuated hammers and hammer drills. More particularly it has to do with working tools of the collared type which are usually arranged to have a limited amount of axial movement.

One object of the invention is to provide an easily operated retainer for rock drills using collared drill steel. Another object is to make the retainer simple of assembly and disassembly. Another object is to provide a construction which will make the parts long lived. Other objects will be apparent from the detailed description which follows.

The retainer of the present invention is arranged for swivelling action from its operative to its inoperative positions and vice-versa. To this end it may have arcuate portions received in similarly shaped recesses or depressions in opposed supporting elements. Resilient means may urge such supporting elements toward each other to produce a yielding clamping effect and to absorb shocks encountered by the retainer from opposite directions. Such means may be mounted on opposite sides of fixed members, such as lugs, on the front head of the machine and protect these parts as well from the shocks of service.

In order to illustrate the invention one concrete embodiment thereof is shown in the accompanying drawing, in which:

Fig. 1 is a side elevational view of the forward end of pneumatic rock drill showing the retaining mechanism in end elevation;

Fig. 2 is a front end elevational view;

Fig. 3 is a view of the parts shown in Fig. 1 after a 90° rotation of the drill, certain parts being shown in section substantially on the line 3—3 of Fig. 1; and Fig. 4 is a top plan view of the front head shown in Fig. 4 partly in section on the line 4—4 of Fig. 1.

In Fig. 1 the forward end of a pneumatic rock drill is disclosed having a cylinder A, a front head B secured to the cylinder as by conventional through bolts C and a working tool, such as drill steel D, extending into the drill to receive the blows of the hammer piston (not shown), the steel being provided with a conventional collar $d$ for limiting its movement within front head B and to enable it to be maintained in operative relation in the drill.

A retainer 5 (Figs. 1 and 2) is supported on front head B in position to engage collar $d$ for limiting the outward movement of steel D. Retainer 5 is resiliently supported on front head B for swivelling movement in a vertical plane corresponding to or parallel with the axis of drill steel D between operative or tool retaining position $x$ shown in full lines in Figs. 1 and 2 and inoperative or tool releasing position $y$ shown in broken outline in Fig. 1. For such swivelling action retainer 5 is clamped between two elements 6 and 7 depending from front head B. To support these elements, front head B has integral perforated lugs $b$ extending in spaced relation from the side thereof. Element 6 may comprise a yoke having parallel arms $6a$ extending through the bores of front head lugs $b$ and with the free ends bridged by a separate or nut yoke 8. Element 7 comprises a support of inverted T shape having bores $7a$ slidably receiving arms $6a$ of yoke 6 and an extension $7b$ in parallelism with yoke arms $6a$ extending between front head lugs $b$ and provided with a reduced end $7c$ extending into a guide bearing provided by bore $8a$ in nut yoke 8. Springs 9 encircle yoke arms $6a$ and are interposed between support 7 and the lower faces of front head lugs $b$, while similar springs 10 are interposed between the upper ends of front head lugs $b$ and nut yoke 8. Nuts 11 in threaded engagement with the free ends of yoke arms $6a$ engage nut yoke 8 to hold elements 6 and 7 in assembled relation upon front head B. Locking projections $8b$ on nut yoke 8 may engage corresponding recesses in nuts 11 to lock the same in adjusted position.

The opposed faces of yoke 6 and support 7 provide arcuate recesses $6b$ and $7d$ respectively in which is received and clamped a cooperating cylindrical portion $5a$ of retainer 5. A latching projection $5b$ (Fig. 1) on retainer 5 engages cooperating recesses in support 7 within arcuate recess $7d$ to latch the retainer in its operative and inoperative positions respectively. For convenient movement of retainer 5 the same is provided with a handle extension $5c$ which performs the additional function of a stop by engaging portion $7e$ of support 7 when in operative position, as clearly indicated in Figs. 1, 3 and 4.

By reason of the above described construction, it will be evident that retainer 5 is resiliently held and supported when struck by collar 3 as well as in the opposite or rebound direction thereby materially decreasing the wear and shock upon the retainer parts. It will also be noted that the retainer unit as a whole is resiliently supported on both sides of front head lugs $b$ so that shocks on the lugs and on the front head are also materially lessened. Renewable bushings 12 may be provided within the bores of front head lugs B, if desired, to be replaced after wear has developed. Retainer 5 cannot open as a result of collar $d$ striking the same, since such action tends to cause rotation about its cylindrical part $5a$ which action is prevented by handle extension $5c$ striking portion $7e$ of support 7. Swivelling of the retaining unit as a whole about the front head lugs $b$ is prevented by nut yoke 8 striking front head $b$ as at $b'$, Figs. 1 and 4.

While the invention has been herein shown in what is now considered to be its preferred form, it is to be understood that the invention is not limited to the specific details thereof, but covers all changes, modifications and adaptations within the scope of the appended claims.

I claim as my invention:

1. The combination with a front head and a collared working tool extending into said head, of retaining means for said tool comprising a yoke depending from said head, a retainer member movably mounted on said yoke, a support on said yoke, and means yieldingly maintaining said support in contact with said member to hold the latter in operative engagement with said yoke.

2. The combination with a front head and a collared working tool extending into said head, of retaining means for said tool comprising a yoke depending from said head, a retainer member, a support having spaced bearings on said yoke for relative sliding movement, resilient means acting on said support, said member having a portion clamped between said yoke and said support and arranged for swivelling movement relative thereto.

3. The combination with a front head and a collared working tool extending into said head, of retaining means for said tool comprising a yoke depending from said head, a retainer member, a support slidable on said yoke with guide bearings adjacent the ends thereof and resilient means on said yoke acting on said support, said member having a portion clamped between said yoke and said support and arranged for swivelling movement relative thereto.

4. The combination with a front head and a collared working tool extending into said head, of retaining means for said tool comprising a yoke depending from said head, a retainer member, a support slidably mounted on said yoke, and resilient means acting on said support, said support and said yoke having opposed recesses and said member having a portion disposed in said recesses for mounting said member on said yoke for swivelling action.

5. The combination with a front head and a collared working tool extending into said head, of retaining means for said tool comprising a yoke depending from said head, a retainer member, a support slidably mounted on said yoke, resilient means acting on said support, said support and said yoke having opposed arcuate recesses and said member having a circular portion disposed in said recesses for swivelling movement on said yoke, and means for maintaining said member in adjusted position.

6. The combination with a percussive machine having a collared working tool extending therewithin, of retaining means for said tool comprising relatively movable elements mounted on said machine for yielding movement relative thereto, one of said elements being slidably mounted on the other of said elements, and a retaining member clamped between said elements for swivelling movement.

7. The combination with a percussive machine having a collared working tool extending therewithin, of retaining means for said tool comprising relatively movable elements mounted on said machine for yielding movement relative thereto, one of said elements being slidably mounted on the other of said elements, and a retaining member clamped between said elements for swivelling movement, said member having an extension engaging one of said elements to provide a stop when said member is in tool retaining position.

8. A percussive machine having a front head with a perforated lug on the side thereof, an element extending through said lug for sliding movement, a second element slidable on said first element, resilient means interposed between said lug and said second element, and a retainer clamped between said elements for cooperating with a working tool supported by said head.

9. In a percussive machine, a front head having spaced perforated lugs on the side thereof, a depending yoke having arms extending through said lugs, springs on said arms above and below said lugs, a support slidable on said arms and engaged by said lower springs, and a retainer member adjustably clamped between said yoke and said support.

10. In a percussive machine, a front head having spaced perforated lugs on the side thereof, a depending yoke having arms extending through said lugs, springs on said arms above and below said lugs, a support slidable on said arms and engaged by said lower springs, said support and said yoke having opposed recesses, and a retainer member mounted in said recesses for swivelling movement.

11. In a percussive machine, a front head having spaced perforated lugs on the side thereof, a depending yoke having arms extending through said lugs, springs on said arms above and below said lugs, a yoke engaging the free ends of said arms, a support slidable on said arms beneath said lower springs, an extension on said support having a bearing in said free end yoke, and a retainer member adjustably clamped between said yoke and said support, said member having a handle engaging said extension when in tool retaining position.

12. In a percussive machine, a front head having spaced perforated lugs on the side thereof, a depending yoke having arms extending through said lugs, springs on said arms above and below said lugs, a yoke engaging the free ends of said arms, a support slidable on said arms beneath said lower springs, an extension on said support having a bearing in said free end yoke, said support and said first-named yoke having opposed arcuate recesses, and a retainer having a portion seated in said recesses for swivelling movement in an axial plane, said member having a handle engaging said extension when in tool retaining position.

GUSTAVE M. NELL.